Figure 4:
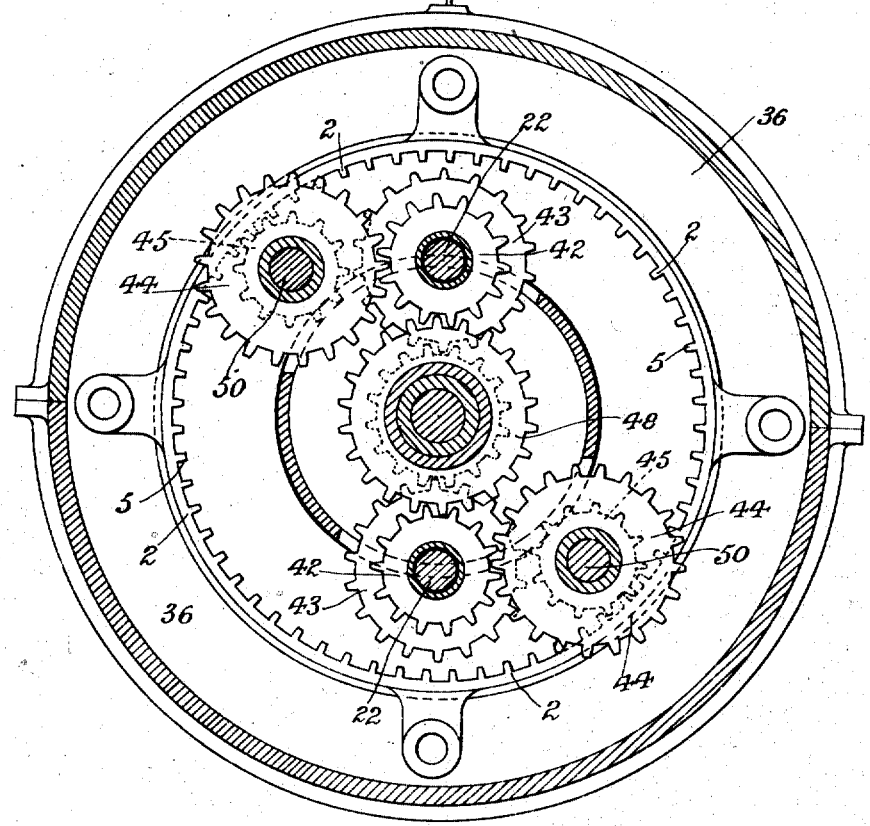

G. POLLARD.
VARIABLE SPEED GEARING.
APPLICATION FILED AUG. 18, 1915.
1,217,059.
Patented Feb. 20, 1917.
5 SHEETS—SHEET 1.
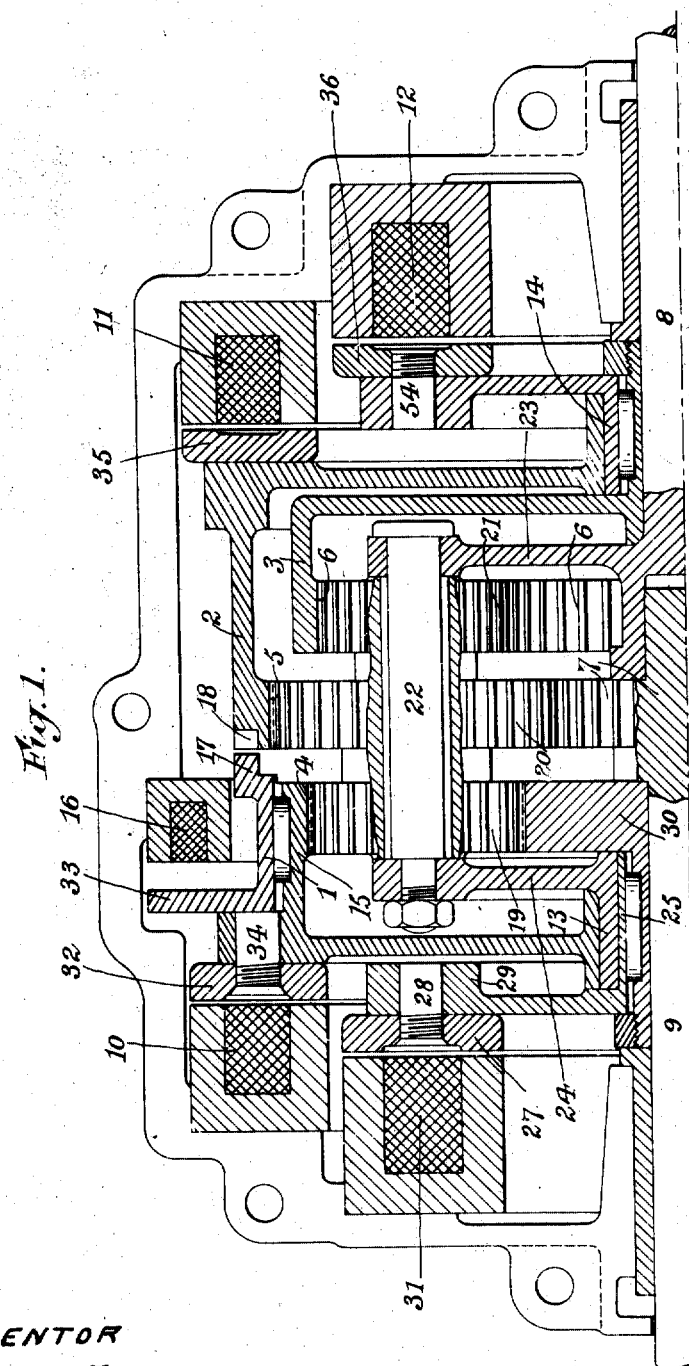
INVENTOR
GEORGE POLLARD
BY Hinson and Hinson
ATTORNEYS

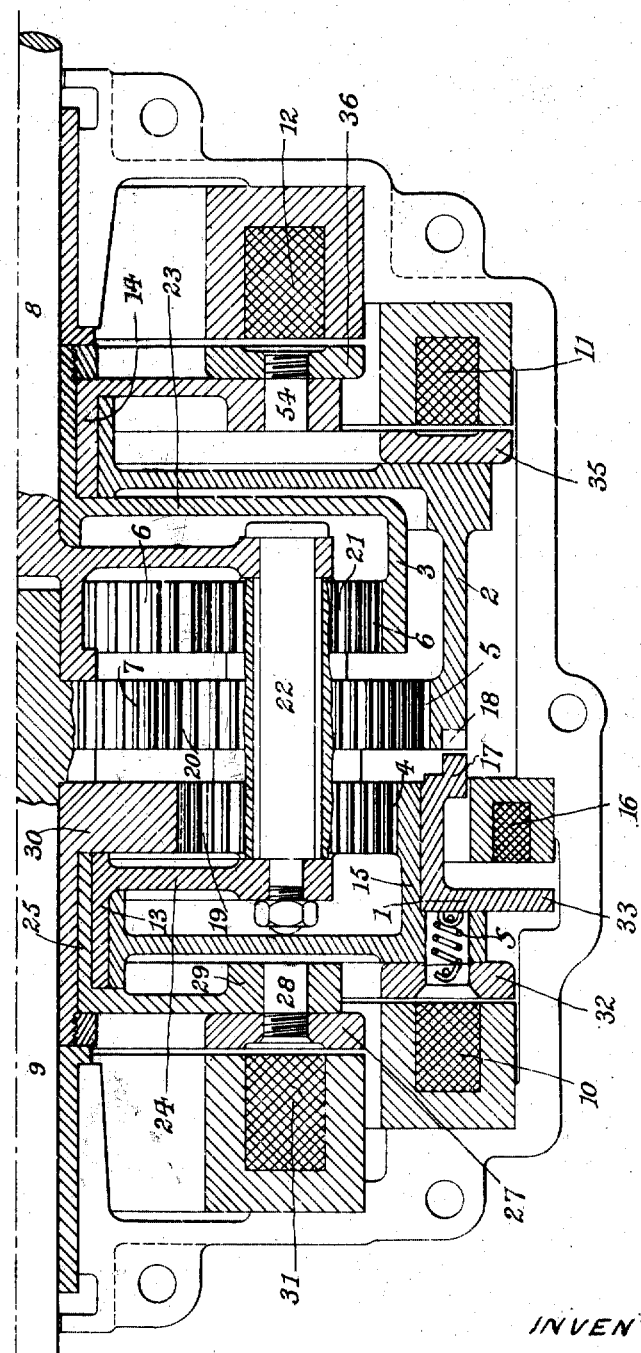

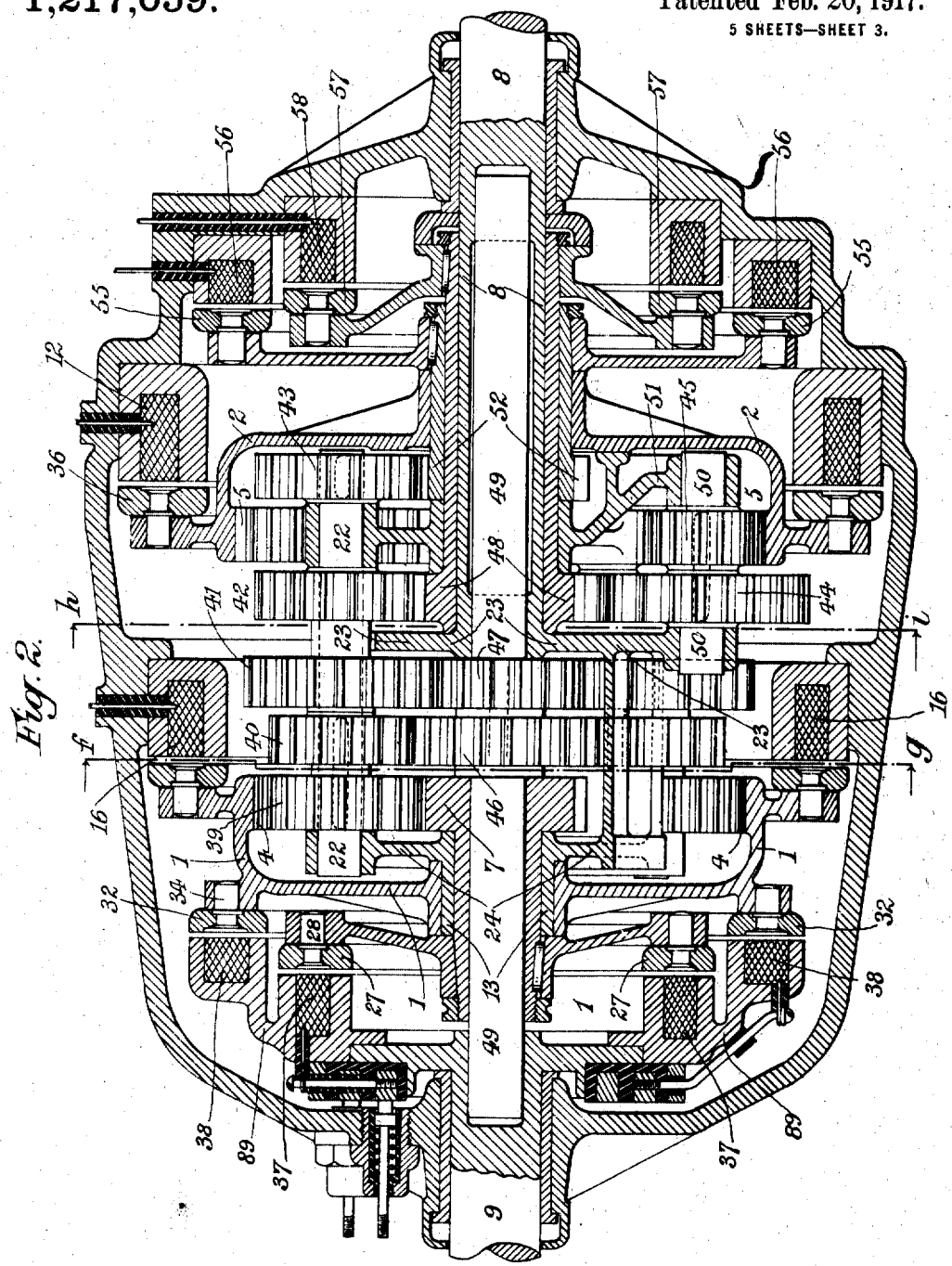

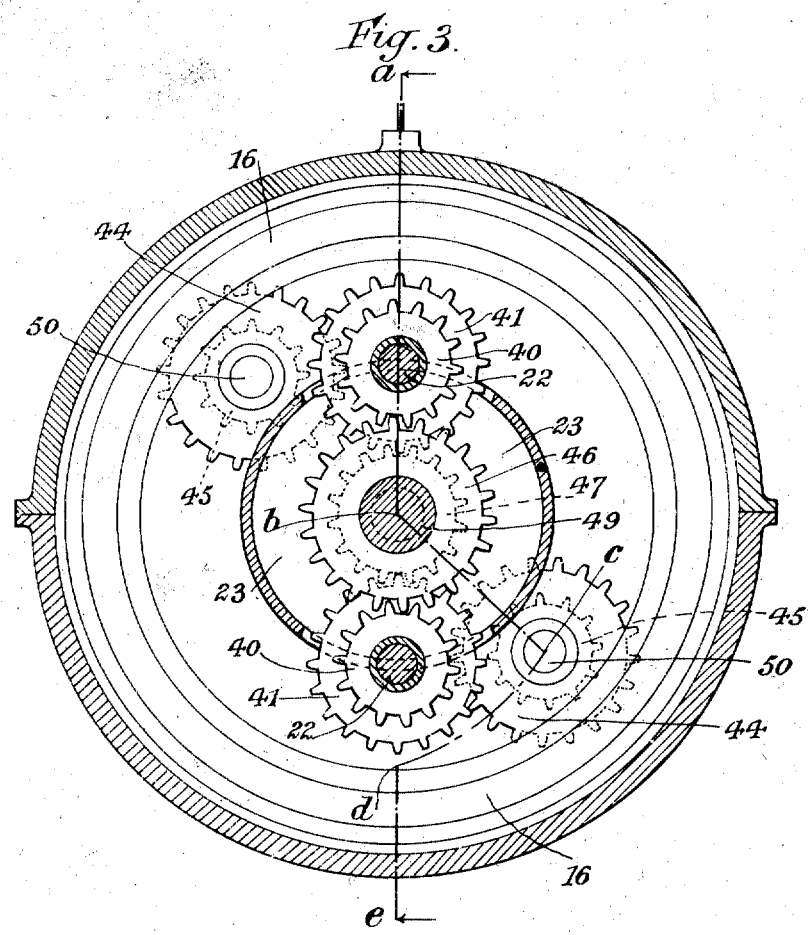

G. POLLARD.
VARIABLE SPEED GEARING.
APPLICATION FILED AUG. 18, 1915.

1,217,059.

Patented Feb. 20, 1917.
5 SHEETS—SHEET 5.

INVENTOR
GEORGE POLLARD

BY Howson and Howson
ATTORNEYS

UNITED STATES PATENT OFFICE.

GEORGE POLLARD, OF PICCADILLY, LONDON, ENGLAND, ASSIGNOR TO MENCO-ELMA SYNDICATE LIMITED, OF LONDON, ENGLAND.

VARIABLE-SPEED GEARING.

1,217,059.  Specification of Letters Patent.  Patented Feb. 20, 1917.

Application filed August 18, 1915. Serial No. 46,179.

*To all whom it may concern:*

Be it known that I, GEORGE POLLARD, a subject of the King of Great Britain, residing at 8 Clarges street, Piccadilly, in the county of London, England, have invented new and useful Improvements in Variable-Speed Gearing, of which the following is a specification.

This invention relates to variable speed gearing of the epicyclic spur-wheel and pinion type and has for its object to provide an improved construction of variable speed gearing of the aforesaid type, which gearing is simple, efficient and compact and in which the various speeds can be brought into operation by stationary, or rotatable, or both stationary and rotatable electro-magnetic clutches.

The gearing hereinafter described is constructed and arranged to form a single unit and is contained within a single gear-box, which may be divided longitudinally, or transversely, or both longitudinally and transversely and which gear is adapted to give two or more forward geared speeds, and a reverse speed the number of forward geared speeds being dependent on the number of sun-wheels, the number of electro-magnetic clutches and the arrangement of the planetary system coöperating therewith.

I will describe the invention with reference to the accompanying drawings, but I do not limit myself to the construction described and illustrated nor to the number of forward geared speeds described with reference to the construction shown in the drawings as any desired number of forward speeds can be obtained by increasing the number of sun-wheels, or planet wheels, or both sun-wheels and planet wheels and electro-magnetic controlling clutches.

Figures 1 and 1ª constitute a longitudinal section of a variable speed gear in accordance with this invention. Fig. 2 is a longitudinal section on the line $a-b-c-d-e$, Fig. 3, of a modified form of gearing shown in Fig. 1. Fig. 3 is a cross-section on the line $f-g$, Fig. 2, and Fig. 4 is a cross-section on the line $h-i$, Fig. 2.

Throughout the drawings like reference numerals indicate the same, or similar parts.

Referring to Fig. 1 of the drawings, the gearing therein shown comprises two, or more cylindrical casings 1, 2 and a casing 3, interior of the casing 2, each casing being provided with internal teeth 4, 5 and 6, and concentrically arranged relatively to a toothed driving wheel 7, and to a driven shaft 8. The driving shaft 9, and the driven shaft 8, are preferably arranged in alinement and the driving wheel 7, may be integral with, or secured to the driving shaft 9. The casings 1, 2, are respectively mounted on the sleeves 13, 14, on the driving shaft 9, and the driven shaft 8, and are capable of rotating independently thereof. The casings can be retarded, or held stationary by stationary electro-magnetic clutches 10, 11, 12, the clutch 10, acting on the casing 1, the clutch 11, acting on the casing 2, and the clutch 12, acting on the casing 3. The casing 1, which is supported on an annulus 15, carrying the internal teeth 4, is capable of sliding axially thereon under the influence of an electro-magnetic clutch 16, so as to cause the projections 17, on the casing 1, to engage the recesses 18, on the casing 2, to effect the direct drive. The casings 1, 2 and 3, are arranged to engage one, or more than one set of toothed planet-wheels 19, 20, 21, respectively, these planet-wheels being shown (in Fig. 1) as formed *en bloc*, but if desired the said planet-wheels, may be formed separately and subsequently secured together so as to rotate *en bloc*, their respective diameters being such as to give the desired speeds in conjunction with the internally toothed casings with which they engage. The planet-wheels 19, 20, 21, which are preferably symmetrically arranged on opposite sides of the central shaft, are supported on spindles 22, carried at one end by radial arms, or a disk 23, integral with, or secured to the driven shaft 8, and at the other end by radial arms, or a disk 24, projecting from the sleeve 13, which is supported by a sleeve 25. This latter is secured to a sun-wheel 30, and can be retarded, or held stationary by an electro-magnetic clutch 31, the armature 27, of which, is slidably secured by pins 28, to a flange or disk 29, formed on the sleeve 25.

The casing 1, is provided with two disks or flanges, 32, 33, of which the disk or flange 32, carried by pins 34, slidable in the annulus 15, forms the armature for the electromagnetic clutch 10, the disk or flange 33, forming the armature for the electro-magnetic clutch 16. The armature 33, is attracted by the clutch 16, when energized preferably against the action of springs S, or other suitable means, which normally tend to keep the said armature away from the clutch 16.

The central planet-wheel 20, is arranged to constantly engage the driving wheel 7, the wheels 19 and 21, being always in gear with the internal teeth 4 and 6, of the casings 1 and 3. 35 and 36, are the armatures of the electro-magnetic clutches 11 and 12, these armatures being slidably supported by pins (such as 28, 34 and 54) mounted in their respective carrying members.

The inner casing 3, is sleeved on the driven shaft 8, and is independently rotatable thereon, the said casing being rigidly connected to the armature 36, of the electro-magnetic clutch 12. Any, or all of the casings 1, 2 and 3 can be retarded, or held stationary by the corresponding electro-magnetic clutches 10, or 16, 11 and 12.

To reverse the direction of rotation of the driven shaft relatively to the driving shaft, the sun-wheel 30, is employed and is preferably arranged as shown on the engine side of the driving wheel 7, this sun-wheel 30, being loosely mounted on the driving shaft 9, and arranged to gear with the planet-wheel or planet-wheels 19.

The electro-magnetic clutches 31, 10, 16, 11 and 12, are all stationary, current being supplied to each in any suitable manner and from any suitable source of supply.

The action of the gear is as follows:—

To obtain the first speed, which is the lowest speed, the coil of the clutch 12 is energized so as to prevent the rotation of the armature 36, and thereby the casing 3, the drive being then through the wheels 7, 20, 21, and the internally toothed casing 6, to the driven shaft 8. The second speed is effected by energizing the coil of the clutch 10, so as to prevent the rotation of the casing 1, the drive then being taken from the wheel 7, through wheels 20, and 19, to the stationary internally toothed casing 1, thereby causing the planetary system to revolve and thereby the driven shaft 8. The third speed is obtained by energizing the coil of the clutch 11, so as to prevent the rotation of the casing 2, the drive being through the wheels 7, 20, and the internally toothed casing 2, which acting as an abutment causes the planetary system to revolve and consequently the driven shaft 8. The fourth speed is effected by energizing the coils of the clutch 16, so as to cause the casing 1, to engage the casing 2, thereby locking the entire gear and giving a direct drive. The reverse drive is effected by energizing the clutch 31, so as to prevent the rotation of the wheel 30, the power being then transmitted from wheel 7, through wheels 20, and 19, to the wheel 30, which causes the planetary system as a whole to rotate in a direction opposite to that of the driving shaft.

In order to obtain a greater difference in the velocity ratios of the various forward geared speeds the modified construction shown in Figs. 2, 3 and 4, may be employed. In this construction, a combination of rotatable and stationary electro-magnetic clutches is employed, the stationary clutches which coöperate with the casings being the same as, or similar to, the electro-magnetic clutches 16, and 12, described with reference to Fig. 1. The rotatable electro-magnetic clutches are marked 37 and 38, these clutches being carried by an annulus 89, integral with, or secured to the driving shaft 9. The armature of the clutch 37, is marked 27, as in Fig. 1, which armature is secured to the driving wheel 7, and is capable of being rotated when the coil of the clutch 37, is energized. The casing 1, in Fig. 2, may be held stationary, or retarded, by the clutch 16, or may be rotated by the clutch 38, acting on the disk armature 32.

The planetary system shown in Fig. 2, comprises the pinions 39, 40, 41, 42, 43, 44, and 45, of which the following pairs are either formed en bloc, or secured together so as to rotate en bloc, these pairs are 39 and 40, 41 and 42, 44 and 45, the pinion 43, being keyed, or otherwise secured to the spindle 22. The planetary pinions are symmetrically arranged, relatively to the driving shaft, each set being diametrically opposite the other set, as shown in Figs. 3 and 4. The pinion 39 gears with the driving wheel 7, and with the internally toothed casing 1. Mounted on an intermediate shaft 49, are two spur wheels 46, 47, which gear with the planetary pinions 40, 41, the spur wheels 46, 47, being secured to the intermediate shaft 49, so as to rotate therewith. The pinions 42, gear with a spur wheel 48, secured to the armature 57, which spur wheel is rotatably mounted on the driven shaft 8, surrounding the intermediate shaft 49, and the pinions 44, gear with the pinions 42. The armature 57, can be controlled by the clutch 58. The pinion wheels 39, 40, 41, 42 and 43, are supported on the spindles 22, and the pinions 44 and 45, are supported by spindles 50, carried by the disk, or arms 23, and the arms 51. The pinions 48, gear with the spur wheel 52, which is secured to the disk armature 55, capable of being held stationary by the clutch 56. The pinions 45, gear at all times with the internally toothed casing 2, as shown in Figs. 2, 3, and 4. The arms or disks 23, 24, form the end walls of a casing having openings to accommodate the pinions 39 and 40 and 41, projections on the casing being provided to support one end of the spindle 50. The wheel 39 of one set of wheels 39, 40, 41, 42, is removed from the lower part of Fig. 2, so as to more clearly show the internal teeth of the casing 1.

The first forward speed is obtained by energizing the coils of the clutches 37 and 16, so as to rotate the driving wheel 7, and retard, or hold stationary the internally toothed casing 1, the drive being then effected through the wheels 7, 39, internally toothed casing 1, thus causing the rotation of the planetary wheel frame, 23, 24, and thereby the hollow driven shaft 8. The second speed is effected by energizing the coil of the clutch 38, so as to rotate the casing 1, and through it the wheels 39, 40 and 42, which latter reacting against the wheel 48, which is held stationary by the clutch 58, energized simultaneously with the clutch 38, causes the planetary wheel frame to rotate and consequently the driven shaft 8.

The third speed is effected by energizing clutches 38 and 56, so as to rotate the casing 1, and hold stationary the gear wheel 52, thus rotating the wheels 39, and 43, around the stationary gear wheel 52, and thereby rotating the planetary wheel frame 23, 24, and driven shaft 8. The direct drive is obtained by energizing clutches 37 and 38, thereby locking the casing 1, wheels 39 and 7, so that the planetary wheel frame rotates with the same speed as the driving shaft.

The reverse drive is set in action by energizing clutches 38 and 12, so as to rotate the casing 1 and hold stationary casing 2, the casing 1, thus causing the wheels 39, to rotate and through them the wheels 46, 47, 41, 42, 44, 45, which latter acting against the casing 2, as an abutment causes the rotation of the planetary wheel frame and the driven shaft 8, in a direction opposite to that of the driving shaft 9.

Suitable ball bearings may be provided for all rotatable parts, and additional ball bearings may also be provided to take up the thrust of any, or all of the internally toothed casings.

While in the explanatory embodiment of my invention here shown, the gear is so constructed and arranged as to permit of three forward geared speeds, a direct forward drive and a reverse, this arrangement may be variously modified to meet special requirements as may be necessary without departing from my invention as pointed out in the subjoined claims.

What I claim is:—

1. In a variable speed changing gear of the epicyclic spur wheel and pinion type, a driving member, a driven member, a carrier rigid with the driven member and freely supported with relation to the driving member, planet pinions mounted on said carrier, means for driving said planet pinions from the driving member, controlling gears operatively associated with the planet pinions and electromagnetic means for selectively operating said controlling gears, for the purpose described.

2. In a variable speed changing gear of the epicyclic spur wheel and pinion type, a driving member, a driven member, a carrier rigid with the driven member and freely supported with relation to the driving member, planet pinions mounted on said carrier, means for driving said planet pinions from the driving member, internal gears operatively associated with the planet pinions and electromagnetic means for selectively operating said internal gears, for the purpose described.

3. In a variable speed changing gear of the epicyclic spur wheel and pinion type, a driving member, a driven member, a carrier rigid with the driven member and freely supported with relation to the driving member, planet pinions mounted on said carrier, means for driving said planet pinions from the driving member, internal controlling gears operatively associated with the planet pinions, and means for mechanically clutching together certain of said internal controlling gears to effect a driving connection between the driving and driven members.

4. In a variable speed changing gear of the epicyclic spur wheel and pinion type, a driving member, a driven member, a carrier rigid with the driven member and freely supported with relation to the driving member, planet pinions mounted on said carrier, means for driving said planet pinions from the driving member, internal controlling gears operatively associated with the planet pinions, coöperating interlocking elements on certain of said controlling gears and electromagnetic means for moving said gears into interlocking engagement to effect a driving connection between the driving and driven members.

5. In a variable speed changing gear of the epicyclic spur wheel and pinion type, a driving member, a driven member, a carrier rigid with the driven member but freely supported with relation to the driving member, planet pinions mounted on said carrier, and means engaging said planet pinions to control the rotation of said carrier and thus the speed of drive through said carrier to the driven member.

6. In a variable speed changing gear of the epicyclic spur wheel and pinion type, a driving member, a driven member, a carrier rigid with the driven member and freely supported with relation to the driving member, planet pinions mounted on said carrier, means for driving said planet pinions from the driving member, internal gears of different diameters meshing with the planet pinions and stationary electromagnetic means for selectively operating said internal gears, for the purpose described.

7. In a variable speed changing gear of the epicyclic spur wheel and pinion type, a driving member, a driven member, a carrier rigid with the driven member and freely supported with relation to the driving member, planet pinions mounted on said carrier, means for driving said planet pinions from the driving member, internal gears of different diameters concentrically arranged with relation to the driving member, and electromagnetic means for selectively operating said internal gears, substantially as described.

8. In a variable speed changing gear of the epicyclic spur wheel and pinion type, a driving member, a driven member, a carrier rigid with the driven member and freely supported with relation to the driving member, planet pinions mounted on said carrier, means for driving said planet pinions from the driving member, internal gears operatively associated with the planet pinions and stationary electromagnets for selectively retarding said internal gears, for the purpose described.

9. In a variable speed changing gear of the epicyclic spur wheel and pinion type, a driving member, a driven member, a carrier rigid with the driven member and freely supported with relation to the driving member, a single set of planet pinions mounted on said carrier, means for driving said planet pinions from the driving member, internal gears operatively associated with the planet pinions and stationary electromagnets for selectively retarding said internal gears, for the purpose described.

10. In a variable speed changing gear of the epicyclic spur wheel and pinion type, a driving member, a driven member, a carrier rigid with the driven member and freely supported with relation to the driving member, planet pinions mounted on said carrier, a driving gear on the driving members and arranged between certain of the pinions of the planetary system, internal gears operatively associated with the planet pinions and stationary electromagnetic means for selectively retarding said controlling gears, for the purpose described.

11. In a variable speed changing gear of the epicyclic spur wheel and pinion type, a driving member, a driven member, a carrier rigid with the driven member and freely supported with relation to the driving member, planet pinions mounted on said carrier, a driving gear on the driving member and arranged between certain of the pinions of the planetary system, internal gears and a sun gear operatively associated with the planet pinions and stationary electromagnetic means for selectively retarding said internal and sun gears, for the purpose described.

In testimony whereof I have signed my name to this specification in the presence of two subscribing witnesses.

GEORGE POLLARD.

Witnesses:
M. W. ANDERSON,
R. BOWYER.